Aug. 25, 1964  C. N. JOHNSEN ETAL  3,145,546
AIR CONDITIONER
Filed April 6, 1962

INVENTORS
CLIFFORD N. JOHNSEN
OSWALD J. WIGGINS
BY
*Holmes & Andersen*
ATTORNEYS 3,145,546
AIR CONDITIONER
Clifford N. Johnsen and Oswald J. Wiggins, both of La Crosse, Wis., assignors to The Trane Company, La Crosse, Wis., a corporation of Wisconsin
Filed Apr. 6, 1962, Ser. No. 185,635
4 Claims. (Cl. 62—427)

This invention relates generally to a compact air conditioner having a compressor, condenser, and evaporator and more particularly to a compact air conditioner which has a novel method of providing outside or ventilating air.

It is an object of the invention to provide a new and novel compact self contained air conditioner of the compressor, condenser, evaporator type.

A second object of the invention is to provide a compact air conditioner which provides a new and novel ventilation system.

A further object of the invention is to provide a compact air conditioner which provides an air duct for untreated outside air and provides another separate duct for the inflow of outside air which has been treated to remove odors, dirt, bacteria, harmful radiation, and other contaminates in the air.

A still further object of the invention is to provide a compact air conditioner which provides manual control of the fresh air duct readily accessible to the area being conditioned.

Other objects and advantages of our invention will be clearly apparent as the specification proceeds to describe the invention with reference to the accompanying drawings, in which.

Figure 1:
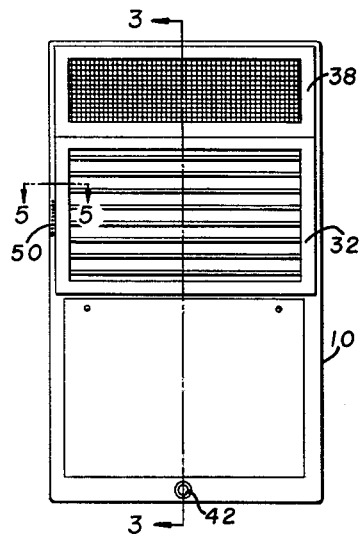
FIGURE 1 is a front elevational view of the air conditioner of this invention.

Looking now at the drawings, the reference numeral 10 designates the casing of a window or room unit type of air conditioner. Insulated partition 12 divides casing 10 into an evaporator compartment 14 and a condenser compartment 16. A motor 18 with double extended shaft 20 is mounted in partition 12 and drives both the condenser fan 22 and the evaporator fan 24.

In normal operation condenser fan 22 draws outside air through the condenser 26 to condense the refrigerant therein, over the compressor 28 to provide external cooling, and ejects the heated condenser air out of the casing 10 through wire fan guard 30 to the atmosphere.

Evaporator fan 24 draws recirculated or room air through adjustable return air register 32 and filter 34 into fan inlet 35. From the fan 24 the recirculated air passes over evaporator 36 where it gives up heat and then is discharged into the conditioned area through adjustable discharge register 38.

A drip pan 40 is provided beneath evaporator 36 to collect the condensate from the evaporator. From the drip pan 40 to the condensate is directed to the drain outlet 42 by any suitable means.

Figure 2:
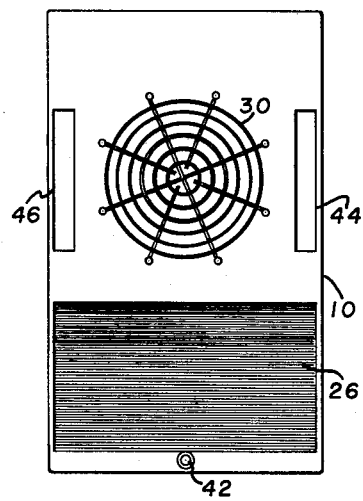
FIGURE 2 is a rear elevational view of the air conditioner shown in FIGURE 1.
Figure 3:
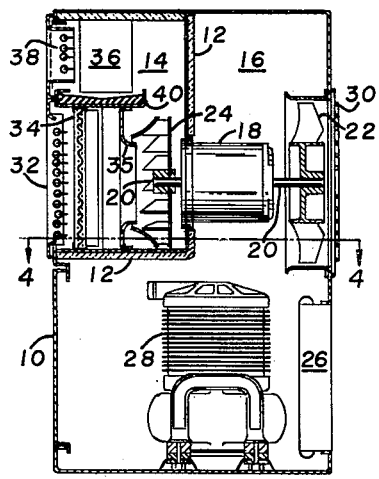
FIGURE 3 is a cross-sectional view taken on line 3—3 of FIGURE 1.
Figure 4:
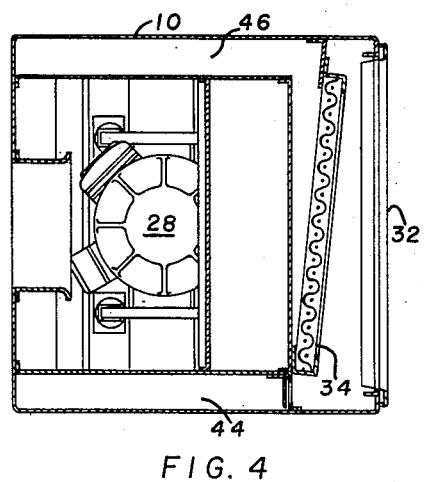
FIGURE 4 is a cross-sectional view taken on line 4—4 of FIGURE 3.
Figure 5:
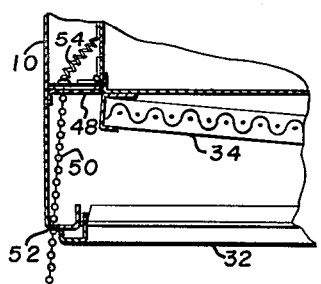
FIGURE 5 is a cross-sectional view taken on line 5—5 of FIGURE 1 showing in detail the manual operator for the fresh air duct damper.

Looking now in particular at FIGURES 2 and 4, a pair of fresh air ducts 44 and 46 are shown for the provision of fresh air to the area being conditioned. Fresh air ducts 44 and 46 are located so that they run along the sides of the unit through the condenser compartment 16.

A sterilizing apparatus, not shown, is connected externally to duct 46 to de-contaminate the fresh air introduced into the conditioned area. The sterilizing apparatus can be any of the commercially available types and does not constitute part of this invention. It should be noted that the fresh air in duct 46 does not pass through the filter 34 since the air in this duct is already cleaned by the above mentioned sterilizing apparatus to remove the contaminates therein.

The flow of fresh air through duct 44 is controlled by a spring loaded damper 48 and a beaded pull chain 50 which projects through the front of the casing into the conditioned area. Fresh air in duct 44 is drawn directly from the atmosphere and therefore must pass through the filter 34.

When it is desired to allow fresh air to enter the conditioned space through fresh air duct 44, beaded pull chain 50 is lifted out of notch 52 and spring 54 pulls damper 48 and chain 50 inwardly to open the duct 44.

As in most air conditioning units of this type, fan motor 18 may be manually operated as well as automatically with the air conditioning system.

As previously pointed out, the normal flow of air in the evaporator compartment is through the return register 32 and out the discharge register 38. If at any time fresh air is desired, damper 48 may be released and fresh air introduced into the evaporator fan inlet 35 through duct 44 and filter 34. It is obvious that this air may be introduced when the complete air conditioning system is operating or on manual operation when only ventilation air is required. It is also obvious that by regulation of adjustable return register 32, either a mixture of recirculated air and fresh air or all fresh air may be supplied to the conditioned space. This is true on automatic or manual operation of the evaporator fan.

Under normal conditions, fresh air duct 46 will be closed by a block-off plate. When some abnormal atmospheric condition occurs such as smog, high bacteria or high radiation count, etc., the sterilizing apparatus, not shown, will be connected to the duct 46 after the block-off plate has been removed. The fresh air damper 48 will be closed in order not to introduce contaminated air into the conditioned space. On either automatic or manual operation of the air conditioning unit, de-contaminated air will be introduced into the evaporator fan inlet 35 by passing filter 34. As before, adjustable return air register 32 may be adjusted to supply a mixture of recirculated air and de-contaminated air or all de-contaminated air. It is also apparent that de-contaminated air and atmospheric air may be mixed if desired but under most conditions this obviously is not desirable.

We have provided a new and novel compact air conditioner which provides means to introduce various types of fresh air into the area being conditioned. Our design takes advantage of space within the unit which is normally unused to provide ventilation ducts to guide the outside air into the evaporator chamber. We have further provided a simple and inexpensive manual control for the fresh air damper which is readily accessible to the area being conditioned.

Although we have described in detail the preferred embodiment of our invention, we contemplate that many changes may be made without departing from the scope or spirit of our invention, and we desire to be limited only by the claims.

We claim:

1. An air conditioner comprising: a casing, means dividing said casing into a condenser compartment and an evaporator compartment, a condenser in said condenser compartment, an evaporator in said evaporator compartment, a return air opening and a discharge air opening in said casing in fluid communication with said evaporator, condenser air inlet and outlet openings in said casing in fluid communication with said condenser compartment, first fan means in said evaporator compartment between said return air opening and said discharge opening to circulate air therebetween, second fan means in said condenser compartment to circulate air from said inlet opening to said outlet opening, a first aperture in said casing, a second aperture in said casing, filter means in said evaporator compartment between said return air opening and said discharge opening, a first duct means for providing fluid communication from said first aperture to a point between said return air opening and said filter, and a second duct means for providing fluid communication from said second aperture to a point between said filter and first fan means.

2. A device as defined by claim 1 wherein said duct means pass through said condenser compartment.

3. The apparatus as defined by claim 2 wherein said first and second apertures in said casing are located adjacent said condenser air outlet opening.

4. An air conditioner comprising: a casing, means dividing said casing into a condenser compartment and an evaporator compartment, a condenser in said condenser compartment, an evaporator in said evaporator compartment, a return air opening and a discharge air opening in said casing in fluid communication with said evaporator, condenser air inlet and outlet openings in said casing in fluid communication with said condenser compartment, first fan means in said evaporator compartment between said return air opening and said discharge opening to circulate air therebetween, second fan means in said condenser compartment to circulate air from said inlet opening to said outlet opening, a first aperture in said casing, a second aperture in said casing, filter means in said evaporator compartment downstream of said return air opening and upstream of said discharge opening, a first conduit means for providing fluid communication from said first aperture to said evaporator compartment at a point downstream of said return air opening and upstream of said filter, and a second conduit means for providing fluid communication from said second aperture to a point downstream of said filter and upstream of said discharge opening.

References Cited in the file of this patent
UNITED STATES PATENTS

| | | |
|---|---|---|
| 2,183,498 | Anderson | Dec. 12, 1939 |
| 2,711,086 | Eilers | June 21, 1955 |
| 2,852,181 | Kline | Sept. 16, 1958 |
| 2,969,652 | Blanchard | Jan. 31, 1961 |